US012528207B2

(12) United States Patent
Cox et al.

(10) Patent No.: US 12,528,207 B2
(45) Date of Patent: Jan. 20, 2026

(54) CARRIER WITH ROTATION PREVENTION FEATURE

(71) Applicant: Applied Materials, Inc., Santa Clara, CA (US)

(72) Inventors: Damon K. Cox, Jarrell, TX (US); Manjunatha Gondihosalli, Bangalore (IN); Karuppasamy Muthukamatchi, Karnataka (IN)

(73) Assignee: Applied Materials, Inc., Santa Clara, CA (US)

( * ) Notice: Subject to any disclaimer, the term of this patent is extended or adjusted under 35 U.S.C. 154(b) by 487 days.

(21) Appl. No.: 18/079,755

(22) Filed: Dec. 12, 2022

(65) Prior Publication Data
US 2024/0190026 A1    Jun. 13, 2024

(51) Int. Cl.
*B25J 19/00* (2006.01)
*B25J 11/00* (2006.01)
*B25J 15/08* (2006.01)

(52) U.S. Cl.
CPC ........... *B25J 19/0004* (2013.01); *B25J 15/08* (2013.01); *B25J 11/0095* (2013.01)

(58) Field of Classification Search
None
See application file for complete search history.

(56) References Cited

U.S. PATENT DOCUMENTS

| 6,199,291 | B1 | 3/2001 | Ozee |
| 6,676,759 | B1 | 1/2004 | Takagi |
| 7,792,350 | B2 | 9/2010 | Kiley et al. |
| 8,384,033 | B2 | 2/2013 | Burns et al. |
| 8,397,739 | B2 | 3/2013 | Gregor et al. |
| 8,784,033 | B2 | 7/2014 | Kremerman et al. |
| 9,457,464 | B2 | 10/2016 | Kremerman et al. |
| 9,579,788 | B2 | 2/2017 | Rosenberg et al. |
| 9,881,820 | B2 | 1/2018 | Wong et al. |
| 9,947,517 | B1 | 4/2018 | Luere et al. |
| 10,014,198 | B2 | 7/2018 | Richardson |
| 10,041,868 | B2 | 8/2018 | Gottscho |
| 10,062,589 | B2 | 8/2018 | Wong et al. |
| 10,062,590 | B2 | 8/2018 | Wong et al. |
| 10,062,599 | B2 | 8/2018 | Genetti et al. |
| 10,103,010 | B2 | 10/2018 | Luere et al. |

(Continued)

FOREIGN PATENT DOCUMENTS

| JP | H0995783 A | 4/1997 |
| JP | H10165884 A | 6/1998 |

(Continued)

OTHER PUBLICATIONS

International Search Report and Written Opinion for International Application No. PCT/US2023/083239, mailed Apr. 3, 2024, 09 Pages.

(Continued)

*Primary Examiner* — Michael S Lowe
(74) *Attorney, Agent, or Firm* — Lowenstein Sandler LLP (57) ABSTRACT

A carrier includes a carrier body, fingers attached to the carrier body, and a rotation prevention component attached to the carrier body. The fingers are configured to support a process kit ring. The rotation prevention component is configured to be disposed proximate a flat inner surface of the process kit ring to prevent rotation of the process kit ring.

20 Claims, 6 Drawing Sheets

(56) References Cited

U.S. PATENT DOCUMENTS

| | | | |
|---|---|---|---|
| 10,124,492 | B2 | 11/2018 | Genetti et al. |
| 10,964,584 | B2 * | 3/2021 | Volfovski .......... H01L 21/68721 |
| 2007/0134904 | A1 | 6/2007 | Wan et al. |
| 2010/0194015 | A1 | 8/2010 | Vekstein et al. |
| 2016/0211165 | A1 | 7/2016 | McChesney et al. |
| 2016/0211166 | A1 | 7/2016 | Yan et al. |
| 2016/0216185 | A1 | 7/2016 | Gottscho |
| 2016/0346897 | A1 | 12/2016 | Reedy et al. |
| 2017/0053819 | A1 | 2/2017 | Richardson |
| 2017/0113355 | A1 | 4/2017 | Genetti et al. |
| 2017/0115657 | A1 | 4/2017 | Trussell et al. |
| 2017/0117172 | A1 | 4/2017 | Genetti et al. |
| 2017/0119339 | A1 | 5/2017 | Johnson et al. |
| 2017/0133283 | A1 | 5/2017 | Kenworthy |
| 2017/0213758 | A1 | 7/2017 | Rice et al. |
| 2017/0236688 | A1 | 8/2017 | Caron et al. |
| 2017/0236741 | A1 | 8/2017 | Angelov et al. |
| 2017/0236743 | A1 | 8/2017 | Severson et al. |
| 2017/0263478 | A1 | 9/2017 | McChesney et al. |
| 2017/0287682 | A1 | 10/2017 | Musselman et al. |
| 2017/0287753 | A1 | 10/2017 | Musselman et al. |
| 2017/0330786 | A1 | 11/2017 | Genetti et al. |
| 2017/0334074 | A1 | 11/2017 | Genetti et al. |
| 2018/0019107 | A1 | 1/2018 | Ishizawa |
| 2018/0019142 | A1 | 1/2018 | Wong et al. |
| 2018/0032062 | A1 | 2/2018 | Trussell et al. |
| 2018/0040492 | A1 | 2/2018 | Wong et al. |
| 2018/0068879 | A1 | 3/2018 | Wong et al. |
| 2018/0090354 | A1 | 3/2018 | Sugita et al. |
| 2018/0166259 | A1 | 6/2018 | Ueda |
| 2018/0218933 | A1 | 8/2018 | Luere et al. |
| 2018/0233328 | A1 | 8/2018 | Ueda et al. |
| 2018/0277416 | A1 | 9/2018 | Takahashi et al. |
| 2018/0301322 | A1 | 10/2018 | Sugita et al. |
| 2018/0315583 | A1 | 11/2018 | Luere et al. |
| 2018/0315640 | A1 | 11/2018 | Ueda et al. |
| 2019/0088531 | A1 | 3/2019 | Sarode Vishwanath et al. |
| 2020/0122320 | A1 | 4/2020 | Yoshida et al. |
| 2020/0373194 | A1 | 11/2020 | Volfovski et al. |
| 2020/0411347 | A1 * | 12/2020 | Kopec .............. H01L 21/67196 |
| 2021/0057256 | A1 * | 2/2021 | Bergantz ........... H01L 21/67196 |
| 2021/0292104 | A1 | 9/2021 | Green et al. |
| 2022/0246408 | A1 | 8/2022 | Genetti et al. |
| 2022/0367155 | A1 | 11/2022 | Jung et al. |

FOREIGN PATENT DOCUMENTS

| | | |
|---|---|---|
| JP | 4559317 B2 | 10/2010 |
| KR | 20160016409 A | 2/2016 |

OTHER PUBLICATIONS

Entegris: "F300 Autopod, Wafer Carrier, Clean, Secure Wafer Transport and Optimum Automation Integration," 2 Pages, [Retrieved on May 20, 2019], Retrieved from URL: https://www.entegris.com/content/dam/shared-product-assets/wafer-processing/datasheet-f300-foup-6073.pdf.

Entegris: "Spectra Foup, Front Opening Unified Pod Platform with Superior Microenvironment Control," 2 Pages, [Retrieved on May 20, 2019] Retrieved from URL: https://www.entegris.com/content/dam/shared-product-assets/wafer-processing/datasheet-spectra-foup-2413.pdf.

International Search Report and Written Opinion for International Application No. PCT/US2020/033774, mailed Sep. 1, 2020, 14 Pages.

* cited by examiner

CARRIER WITH ROTATION PREVENTION FEATURE

TECHNICAL FIELD

Embodiments of the present disclosure relate to apparatuses and methods for transfer of content, and in particular to a carrier for transfer of content such as process kit rings in a substrate processing system.

BACKGROUND

In substrate processing and other electronics processing, systems are often used that include robotic arms to transport substrates between chambers.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In an aspect of the disclosure, a carrier includes a carrier body, fingers attached to the carrier body, and a rotation prevention component attached to the carrier body. The fingers are configured to support a process kit ring. The rotation prevention component is configured to be disposed proximate a flat inner surface of the process kit ring to prevent rotation of the process kit ring.

In another aspect of the disclosure, a rotation prevention component is of a carrier. The rotation prevention component includes an attachment portion forming openings. The attachment portion is configured to receive a corresponding fastener via each of the openings to attach the attachment portion to a carrier body of the carrier. The rotation prevention component further includes one or more protrusion portions extending from the attachment portion. The one or more protrusion portions are configured to be disposed proximate a flat inner surface of a process kit ring disposed on the carrier to prevent rotation of the process kit ring.

In another aspect of the disclosure, a carrier includes fingers configured to support a process kit ring. The carrier further includes a rotation prevention component configured to prevent rotation of the process kit ring. The rotation prevention component includes a first protrusion configured to be disposed proximate a first portion of a curved inner surface of the process kit ring on a first side of a flat inner surface of the process kit ring. The rotation prevention component further includes a second protrusion configured to be disposed proximate a second portion of the curved inner surface of the process kit ring on a second side of the flat inner surface.

BRIEF DESCRIPTION OF THE DRAWINGS

The present disclosure is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

DETAILED DESCRIPTION OF EMBODIMENTS

Described herein are technologies related to a carrier that includes a rotation prevention feature (e.g., semiconductor process kit carrier with feature to prevent rotation during transport).

Manufacturing systems are used to make products. For example, substrate processing systems are used to process and produce finished substrates. Robots are used to move objects to, from, and within substrate processing systems. Objects include substrates, process kit rings, etc. Objects are to be positioned correctly (e.g., correctly aligned) within the substrate processing system. For example, a process kit ring is to be disposed in a particular orientation in a processing chamber. In conventional systems, objects become incorrectly positioned (e.g., rotate, misaligned) during transport to, from, and/or within the substrate processing system. Devices (e.g., an aligner device and a local center finder (LCF) device) are used to attempt to correct positions (e.g., rotation, alignment) of objects. These devices can only correct a threshold amount of incorrect positioning. Conventionally, the amount of incorrect positioning (e.g., incorrect rotation, misalignment) of objects (e.g., as a result of transportation) may be greater than the threshold amount of correction that these devices can perform. Incorrectly positioned objects causes non-uniformity of processing of substrates, damage of components, opening of the substrate processing system and corresponding re-commissioning process, decreased throughput, decreased quality of substrates, increased user time, increased energy used, and so forth.

The devices, systems, and methods disclosed herein provide a carrier that includes a rotation prevention feature.

A carrier includes a carrier body, fingers attached to the carrier body, and a rotation blocking component attached to the carrier body. The fingers are configured to support a process kit ring (e.g., a lower surface of the process kit ring is to be disposed on an upper surface of the fingers). The rotation prevention component (e.g., rotation prevention feature) is configured to be disposed proximate a flat inner surface of the process kit ring to prevent rotation of the process kit ring.

The devices, systems, and methods disclosed herein have advantages over conventional solutions. The carrier of the present disclosure prevents rotation of objects disposed on the carrier. This causes the objects to be more correctly positioned than conventional solutions. This causes increased uniformity of processing of substrates, less damage to components, less opening of the substrate processing system and less re-commissioning processes, increased throughput, increased quality of substrates, decreased user time, decreased energy used, and so forth. The carrier of the present disclosure Although portions of the present description refer to process kit rings, the present description can be applied to different types of content (e.g., to different types of chamber components, such as an edge ring, a showerhead, a mask, a mask handler, a half ring, or the like, in addition to process kit rings). Although portions of the present description refer to substrate processing systems, the present description can be applied to other types of systems.

Figure 1:
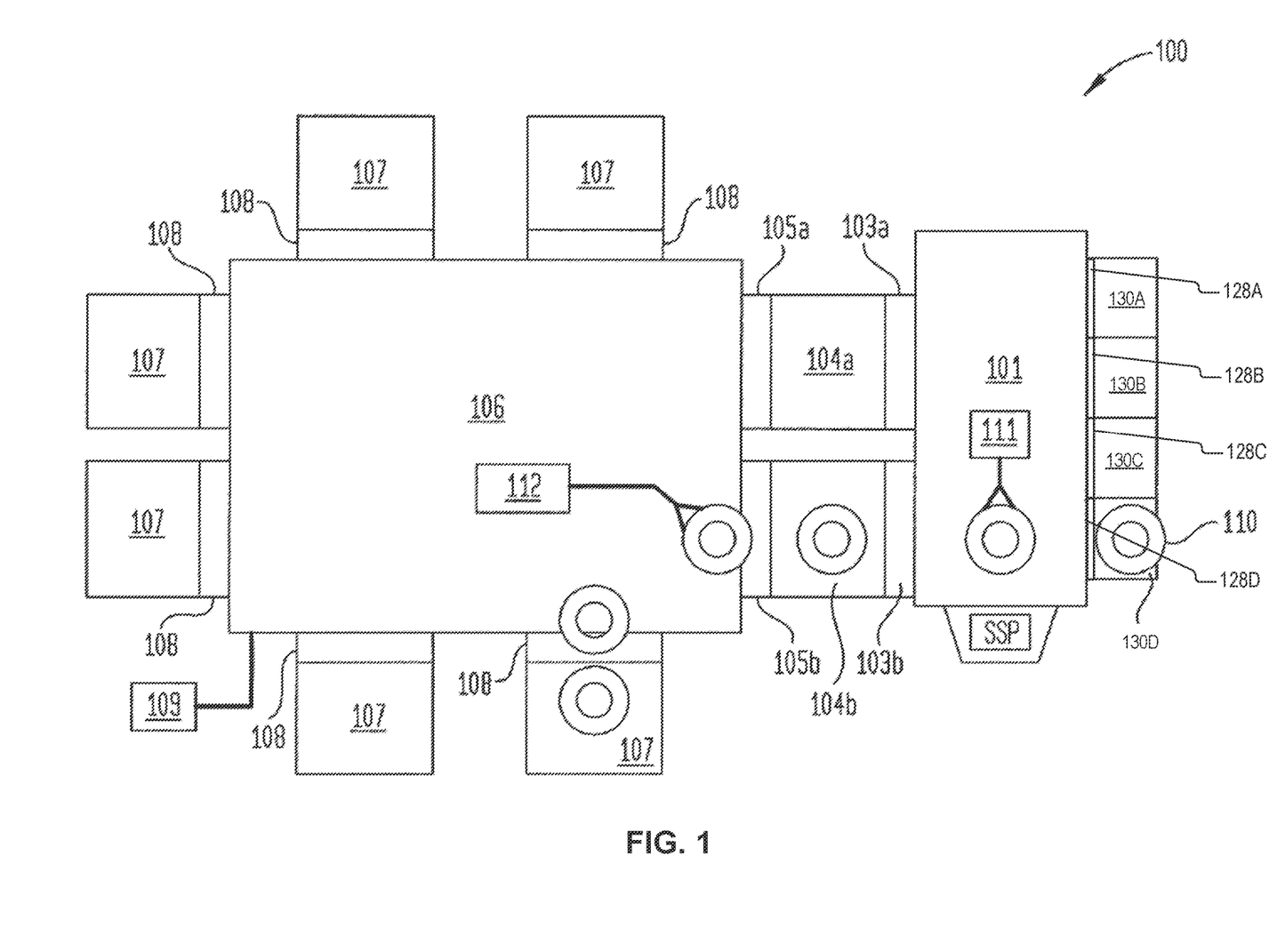
FIG. 1 illustrates a processing system, according to certain embodiments.

FIG. 1 illustrates a processing system 100 (e.g., substrate processing system, semiconductor manufacturing system, etc.), according to certain embodiments. The processing system 100 includes a factory interface 101 and load ports 128 (e.g., load ports 128A-D). In some embodiments, the load ports 128A-D are directly mounted to (e.g., seal against) the factory interface 101. Enclosure systems 130 (e.g., cassette, Front Opening Unified Pod (FOUP), process kit enclosure system, or the like) are configured to removably couple (e.g., dock) to the load ports 128A-D. Referring to FIG. 1, enclosure system 130A is coupled to load port 128A, enclosure system 130B is coupled to load port 128B, enclosure system 130C is coupled to load port 128C, and enclosure system 130D is coupled to load port 128D. In some embodiments, one or more enclosure systems 130 are coupled to the load ports 128 for transferring wafers and/or other substrates into and out of the processing system 100. Each of the enclosure systems 130 seal against a respective load port 128. In some embodiments, a first enclosure system 130A is docked to a load port 128A (e.g., for replacing used process kit rings). Once such operation or operations are performed, the first enclosure system 130A is then undocked from the load port 128A, and then a second enclosure system 130 (e.g., a FOUP containing wafers) is docked to the same load port 128A. In some embodiments, a carrier (e.g., that includes a rotation prevention component attached to a carrier body) is used to transport content between the enclosure systems 130 and other portions of the processing system 100.

In some embodiments, a load port 128 includes a front interface that forms a vertical opening (or a substantially vertical opening). The load port 128 additionally includes a horizontal surface for supporting an enclosure system 130 (e.g., cassette, process kit enclosure system). Each enclosure system 130 (e.g., FOUP of wafers, process kit enclosure system) has a front interface that forms a vertical opening. The front interface of the enclosure system 130 is sized to interface with (e.g., seal to) the front interface of the load port 128 (e.g., the vertical opening of the enclosure system 130 is approximately the same size as the vertical opening of the load port 128). The enclosure system 130 is placed on the horizontal surface of the load port 128 and the vertical opening of the enclosure system 130 aligns with the vertical opening of the load port 128. The front interface of the enclosure system 130 interconnects with (e.g., clamp to, be secured to, be sealed to) the front interface of the load port 128. A bottom plate (e.g., base plate) of the enclosure system 130 has features (e.g., load features, such as recesses or receptacles, that engage with load port kinematic pin features, a load port feature for pin clearance, and/or an enclosure system docking tray latch clamping feature) that engage with the horizontal surface of the load port 128. The same load ports 128 that are used for different types of enclosure systems 130 (e.g., process kit enclosure system, cassettes that contain wafers, etc.).

In some embodiments, the enclosure system 130 (e.g., process kit enclosure system) includes one or more items of content 110 (e.g., one or more of a process kit ring, an empty process kit ring carrier, a process kit ring disposed on a process kit ring carrier, a placement validation wafer, component of the processing system 100, etc.). In some examples, the enclosure system 130 is coupled to the factory interface 101 (e.g., via load port 128) to enable automated transfer of a process kit ring on a process kit ring carrier into the processing system 100 for replacement of a used process kit ring.

In some embodiments, the processing system 100 also includes first vacuum ports 103a, 103b coupling the factory interface 101 to respective degassing chambers 104a, 104b. Second vacuum ports 105a, 105b are coupled to respective degassing chambers 104a, 104b and disposed between the degassing chambers 104a, 104b and a transfer chamber 106 to facilitate transfer of wafers and content 110 (e.g., process kit rings) into the transfer chamber 106. In some embodiments, a processing system 100 includes and/or uses one or more degassing chambers 104 and a corresponding number of vacuum ports 103, 105 (e.g., a processing system 100 includes a single degassing chamber 104, a single first vacuum port 103, and a single second vacuum port 105). The transfer chamber 106 includes a plurality of processing chambers 107 (e.g., four processing chambers 107, six processing chambers 107, etc.) disposed therearound and coupled thereto. The processing chambers 107 are coupled to the transfer chamber 106 through respective ports 108, such as slit valves or the like. In some embodiments, the factory interface 101 is at a higher pressure (e.g., atmospheric pressure) and the transfer chamber 106 is at a lower pressure (e.g., vacuum). Each degassing chamber 104 (e.g., load lock, pressure chamber) has a first door (e.g., first vacuum port 103) to seal the degassing chamber 104 from the factory interface 101 and a second door (e.g., second vacuum port 105) to seal the degassing chamber 104 from the transfer chamber 106. Content is to be transferred from the factory interface 101 into a degassing chamber 104 while the first door is open and the second door is closed, the first door is to close, the pressure in the degassing chamber 104 is to be reduced to match the transfer chamber 106, the second door is to open, and the content is to be transferred out of the degassing chamber 104. A local center finding (LCF) device is to be used to align the content in the transfer chamber 106 (e.g., before entering a processing chamber 107, after leaving the processing chamber 107).

In some embodiments, the processing chambers 107 includes or more of etch chambers, deposition chambers (including atomic layer deposition, chemical vapor deposition, physical vapor deposition, or plasma enhanced versions thereof), anneal chambers, or the like.

Factory interface 101 includes a factory interface robot 111. Factory interface robot 111 includes a robot arm, such as a selective compliance assembly robot arm (SCARA) robot. Examples of a SCARA robot include a 2 link SCARA robot, a 3 link SCARA robot, a 4 link SCARA robot, and so on. The factory interface robot 111 includes an end effector on an end of the robot arm. The end effector is configured to pick up and handle specific objects, such as wafers. Alternatively, or additionally, the end effector is configured to handle objects such as a carrier and/or process kit rings (edge rings). The robot arm has one or more links or members (e.g., wrist member, upper arm member, forearm member, etc.) that are configured to be moved to move the end effector in different orientations and to different locations.

The factory interface robot 111 is configured to transfer objects between enclosure systems 130 (e.g., cassettes, FOUPs) and degassing chambers 104a, 104b (or load ports). While conventional systems are associated with opening of (e.g., disassembly of, breaking the seal of, contaminating) a processing system (e.g., factory interface, transfer chamber, processing chamber) to replace different types of content, the processing system 100 is configured to facilitate transfer and replacement of content without opening of (e.g., disassembly of, breaking the seal of, contaminating) the processing system 100 by an operator. Accordingly, in some embodiments, a sealed environment including an interior volume of an enclosure system 130 and an internal volume of the factory interface 101 are maintained during the replacement of content (e.g., via a carrier including a rotation prevention component).

Transfer chamber 106 includes a transfer chamber robot 112. Transfer chamber robot 112 includes a robot arm with an end effector at an end of the robot arm. The end effector is configured to handle particular objects, such as wafers. In some embodiments, the transfer chamber robot 112 is a SCARA robot, but has fewer links and/or fewer degrees of freedom than the factory interface robot 111 in some embodiments.

A controller 109 controls various aspects of the processing system 100. The controller 109 is and/or includes a computing device such as a personal computer, a server computer, a programmable logic controller (PLC), a microcontroller, and so on. The controller 109 includes one or more processing devices, which, in some embodiments, are general-purpose processing devices such as a microprocessor, central processing unit, or the like. More particularly, in some embodiments, the processing device is a complex instruction set computing (CISC) microprocessor, reduced instruction set computing (RISC) microprocessor, very long instruction word (VLIW) microprocessor, or a processor implementing other instruction sets or processors implementing a combination of instruction sets. In some embodiments, the processing device is one or more special-purpose processing devices such as an application specific integrated circuit (ASIC), a field programmable gate array (FPGA), a digital signal processor (DSP), network processor, or the like. In some embodiments, the controller 109 includes a data storage device (e.g., one or more disk drives and/or solid state drives), a main memory, a static memory, a network interface, and/or other components. In some embodiments, the controller 109 executes instructions to perform any one or more of the methods or processes described herein. The instructions are stored on a computer readable storage medium, which include one or more of the main memory, static memory, secondary storage and/or processing device (during execution of the instructions). The controller 109 receives signals from and sends controls to factory interface robot 111 and wafer transfer chamber robot 112 in some embodiments.

FIG. 1 schematically illustrates transfer of content 110 (e.g., carrier supporting a process kit ring) into a processing chamber 107. According to one aspect of the disclosure, content 110 is removed from an enclosure system 130 via factory interface robot 111 located in the factory interface 101. The factory interface robot 111 transfers the content 110 through one of the first vacuum ports 103a, 103b and into a respective degassing chamber 104a, 104b. A transfer chamber robot 112 located in the transfer chamber 106 removes the content 110 from one of the degassing chambers 104a, 104b through a second vacuum port 105a or 105b. The transfer chamber robot 112 moves the content 110 into the transfer chamber 106, where the content 110 is transferred to a processing chamber 107 though a respective port 108. While not shown for clarity in FIG. 1, transfer of the content 110 includes transfer of a process kit ring disposed on a process kit ring carrier, transfer of an empty process kit ring carrier, transfer of a placement validation wafer, etc.

FIG. 1 illustrates one example of transfer of content 110, however, other examples are also contemplated. In some examples, it is contemplated that the enclosure system 130 is coupled to the transfer chamber 106 (e.g., via a load port mounted to the transfer chamber 106). From the transfer chamber 106, the content 110 is to be loaded into a processing chamber 107 by the transfer chamber robot 112. Additionally, in some embodiments, content 110 is loaded in a substrate support pedestal (SSP). In some embodiments, an additional SSP is positioned in communication with the factory interface 101 opposite the illustrated SSP. Processed content 110 (e.g., a used process kit ring) is to be removed from the processing system 100 in reverse of any manner described herein. When utilizing multiple enclosure systems 130 or a combination of enclosure system 130 and SSP, in some embodiments, one SSP or enclosure system 130 is to be used for unprocessed content 110 (e.g., new process kit rings), while another SSP or enclosure system 130 is to be used for receiving processed content 110 (e.g., used process kit rings).

The processing system 100 includes chambers, such as factory interface 101 (e.g., equipment front end module (EFEM)) and adjacent chambers (e.g., load port 128, enclosure system 130, SSP, degassing chamber 104 such as a loadlock, or the like) that are adjacent to the factory interface 101. One or more of the chambers is sealed (e.g., each of the chambers is sealed). The adjacent chambers are sealed to the factory interface 101. In some embodiments, inert gas (e.g., one or more of nitrogen, argon, neon, helium, krypton, or xenon) is provided into one or more of the chambers (e.g., the factory interface 101 and/or adjacent chambers) to provide one or more inert environments. In some examples, the factory interface 101 is an inert EFEM that maintains the inert environment (e.g., inert EFEM minienvironment) within the factory interface 101 so that users do not need to enter the factory interface 101 (e.g., the processing system 100 is configured for no manual access within the factory interface 101).

In some embodiments, gas flow (e.g., inert gas, nitrogen) is provided into one or more chambers (e.g., factory interface 101) of the processing system 100. In some embodiments, the gas flow is greater than leakage through the one or more chambers to maintain a positive pressure within the one or more chambers. In some embodiments, the inert gas within the factory interface 101 is recirculated. In some embodiments, a portion of the inert gas is exhausted. In some embodiments, the gas flow of non-recirculated gas into the factory interface 101 is greater than the exhausted gas flow and the gas leakage to maintain a positive pressure of inert gas within the factory interface 101. In some embodiments, the factory interface 101 is coupled to one or more valves and/or pumps to provide the gas flow into and out of the factory interface 101. A processing device (e.g., of controller 109) controls the gas flow into and out of the factory interface 101. In some embodiments, the processing device receives sensor data from one or more sensors (e.g., oxygen sensor, moisture sensor, motion sensor, door actuation sensor, temperature sensor, pressure sensor, etc.) and determines, based on the sensor data, the flow rate of inert gas flowing into and/or out of the factory interface 101.

The enclosure system 130 allows for transfer and replacement of different types of content 110 (e.g., via a carrier including a rotation prevention component) without opening the sealed environment within the factory interface 101 and adjacent chambers. The enclosure system 130 seals to the load port 128 responsive to being docked on the load port 128. The enclosure system 130 provides purge port access so that the interior of the enclosure system 130 can be purged prior to opening the enclosure system 130 to minimize disturbance of the inert environment within the factory interface 101.

Figure 2A:
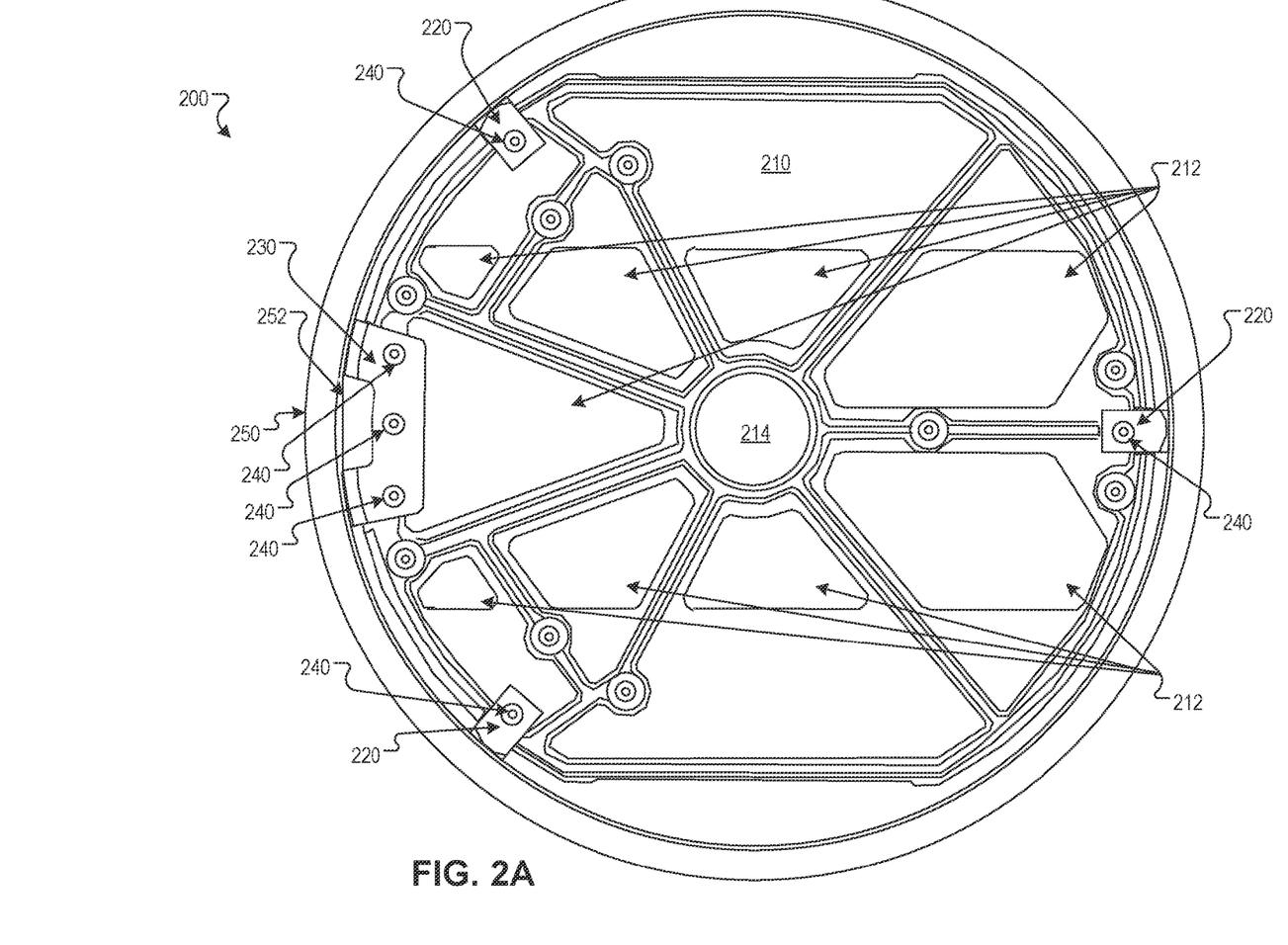
FIGS. 2A-C illustrate views of a carrier, according to certain embodiments.
Figure 2B:
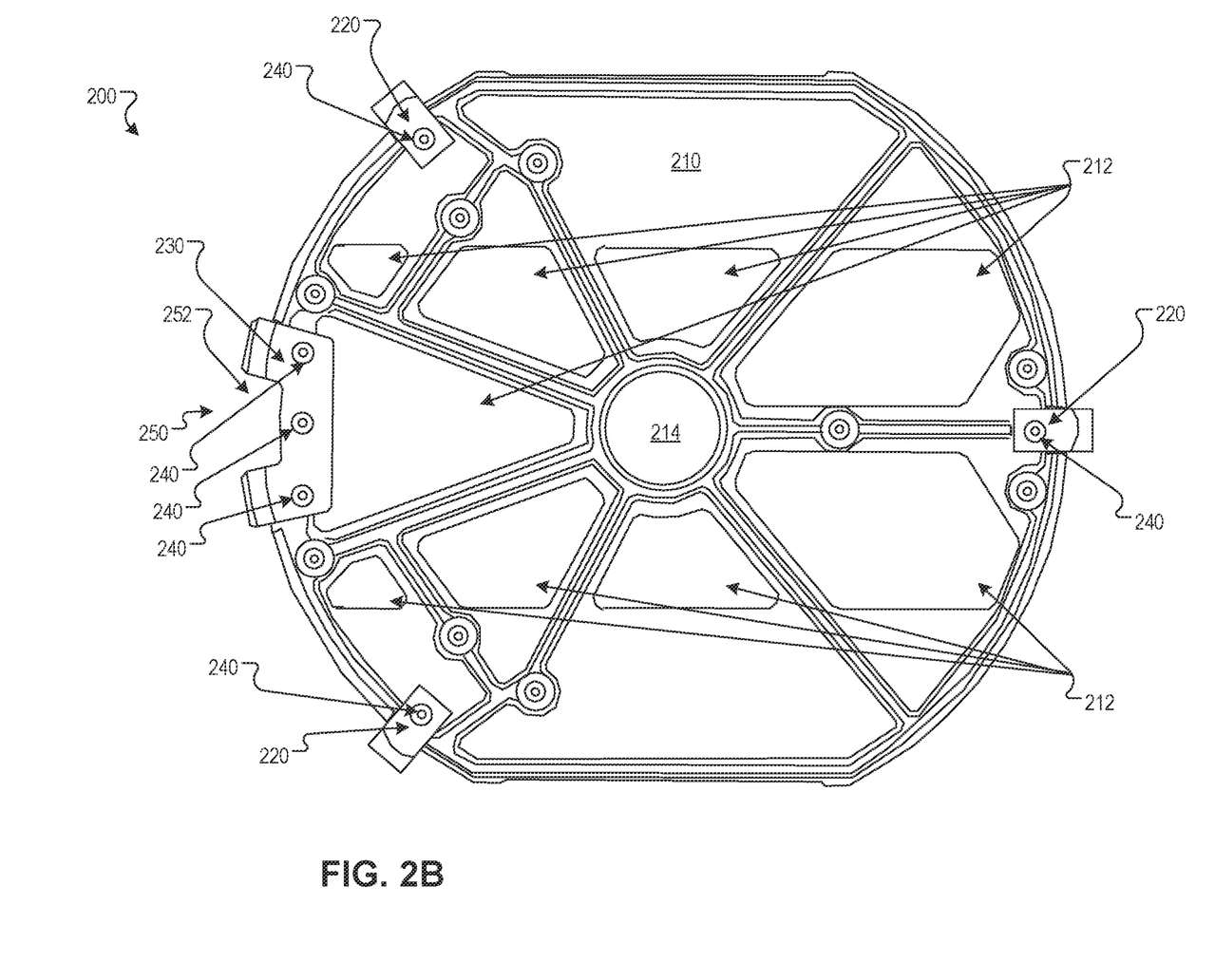
Figure 2C:
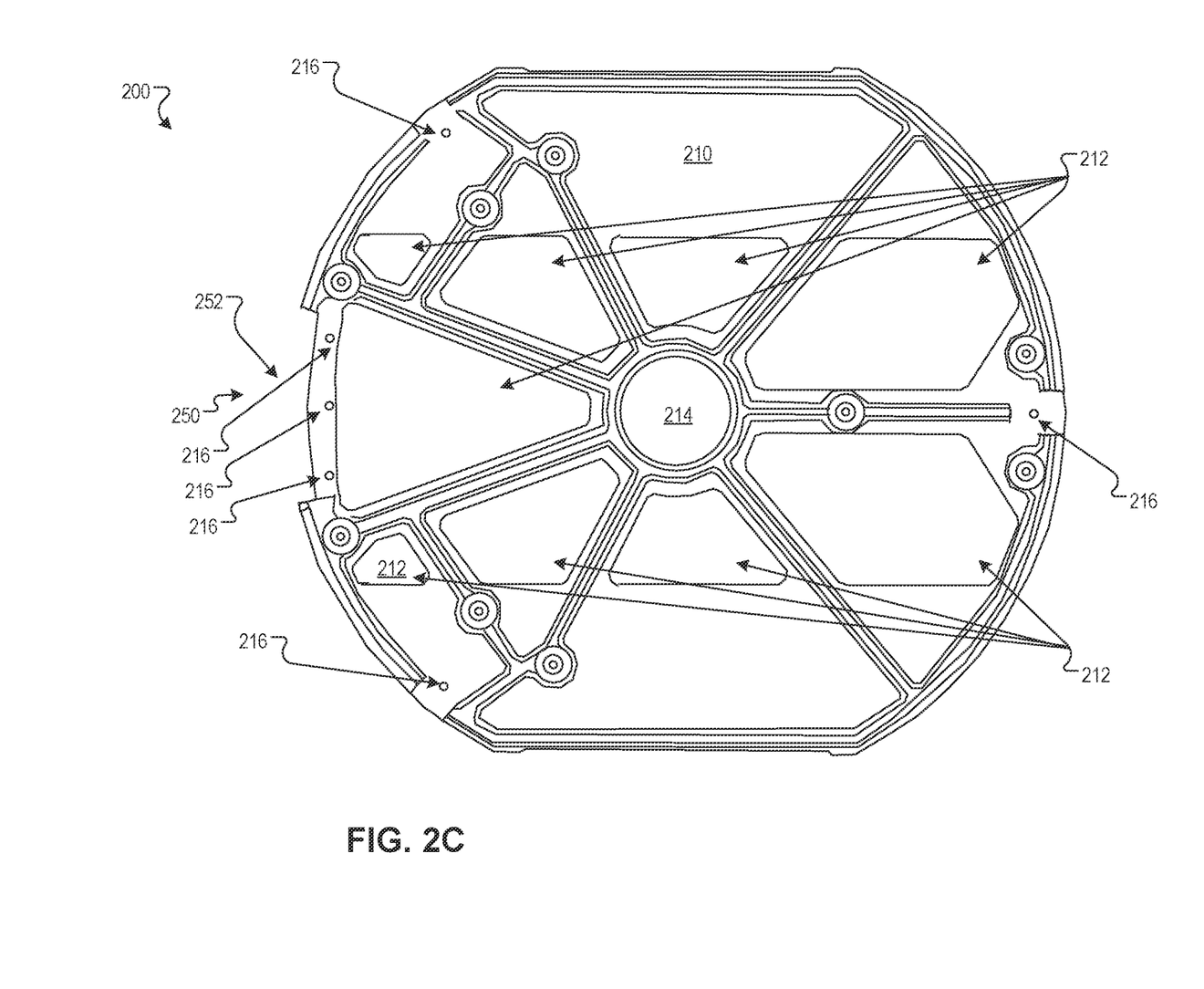

FIGS. 2A-C illustrate views of a carrier 200, according to certain embodiments. FIG. 2A illustrates a carrier 200 supporting a process kit ring 250, according to certain embodiments. FIG. 2B illustrates a carrier 200 without a process kit ring 250, according to certain embodiments. FIG. 2C illustrates a carrier 200 without fingers 220 and without a rotation prevention component 230.

Carrier 200 includes a carrier body 210 (e.g., substantially rigid body), fingers 220, a rotation prevention component 230, and fasteners 240 (e.g., screws, bolts, rivets, etc.). The fingers 220 are attached (e.g., each fastened via a fastener 240) to the carrier body 210. The fingers 220 are configured to support a process kit ring 250. In some embodiments, carrier 200 includes at least three fingers 220. In some embodiments, carrier 200 includes three fingers 220. Each of the fingers 220 may form a lip and a lower surface of the process kit ring 250 may be disposed on the lip. In some embodiments, the fingers 220 are configured to align the process kit ring 250 horizontally relative to the carrier body 210.

The rotation prevention component 230 is attached (e.g., fastened via fasteners 240) to the carrier body 210. The rotation prevention component 230 is configured to be disposed proximate a flat inner surface 252 of the process kit ring 250 to prevent rotation of the process kit ring 250. In some embodiments, the rotation prevention component 230 includes a thermoplastic. In some embodiments, the rotation prevention component 230 includes polybenzimidazole (PBI) fiber.

Carrier body 210 may form openings 212 (e.g., windows, slots, etc.). In some embodiments, the openings 212 are used by tool automation (e.g., by the aligner device, by the LCF device) to view through the carrier 200 (e.g., to view objects on the other side of the carrier 200) for placement accuracy. In some embodiments, the openings 212 are used to reduce the mass of the carrier 200 (e.g., carrier body 210).

to lower the mass of the carrier 200, to allow viewing through the carrier body 210, to allow light passage of light or objects through the carrier body 210, etc.).

The process kit ring 250 may be a circular shape (e.g., a ring) that has a substantially flat upper surface, a substantially flat lower surface, a curved outer surface, a curved inner surface, and a flat inner surface 252. The flat inner surface 252 may be used to locate the process kit ring 250.

Referring to FIG. 2C, carrier body 210 may form openings 216 that are configured to receive a fastener 240. In some embodiments, the openings 216 are threaded to removably receive a fastener 240. In some embodiments, the fasteners 240 are threaded to secure to the openings 216 that are threaded. In some embodiments, the fasteners 240 are threaded to secure to the fingers 220 and/or rotation prevention component 230 that are threaded. In some embodiments, each fastener 240 includes a first portion and a second portion (e.g., a bolt and a nut, etc.) that are configured to secure to each other to secure the fingers 220 and/or rotation prevention component 230 to the carrier body 210.

Fingers 220 and/or rotation prevention component 230 are configured to be removably attached to the carrier body 210 via the fasteners 240 and the openings 216. In some embodiments, each finger 220 and/or rotation prevention component 230 forms an opening and a fastener 240 is configured to removably attach the finger 220 and/or rotation prevention component 230 to the carrier body 210 by being inserted through the opening of the finger 220 and/or rotation prevention component 230 and the opening 216 of the carrier body 210.

In some embodiments, different sets of fingers 220 are used for different types of content. In some examples, the different types of content include new content and used content (e.g., a first set of fingers 220 secured to a carrier body 210 for transporting used content and a second set of fingers 220 secured to the same carrier body 210 for transporting new content). In some examples, the different types of content include different sizes and/or shapes of content (e.g., a first set of fingers 220 secured to a carrier body 210 for transporting a first size and/or shape of content and a second set of fingers 220 secured to the same carrier body 210 for transporting a different size and/or shape of content). In some examples, different types of content include one or more of a process kit ring, a chamber component of the substrate processing system, a used chamber component of the substrate processing system, a showerhead, a component with a substantially round perimeter (e.g., inside perimeter, outside perimeter), or the like.

In some embodiments, different sets of fingers 220 are used for different conditions. In some embodiments, each finger 220 of a first set of fingers 220 includes a first material configured for first conditions and each finger of a second set of fingers includes a second material configured for second conditions that are different than the first conditions. In some examples, material of a finger 220 includes one or more of polyethylene terephthalate (PET), ceramic material, polytetrafluoroethylene (PTFE) (e.g., Teflon™), ultra high molecular weight (UHMW) polyethylene, absorptive material, non-absorptive material, coated material, deformative material, electrostatic dissipative material, or the like. In some embodiments, the fingers 220 have a particular conductivity (e.g., less than perfect conductivity, some conductivity to allow dissipation at a controlled rate, preventing conductive paths of high arch discharge, dissipative range from about $10^5$ to about $10^9$ Ohms, etc.). In some examples, the different conditions include one or more of corrosive conditions, clean conditions, electrostatic conditions, particular processes (e.g., substrate manufacturing processes, atomic layer deposition, chemical vapor deposition, physical vapor deposition, plasma enhanced versions thereof, or the like), particular chemistries (e.g., fluorine, acid, base, or the like), a particular temperature range (e.g., high temperature), a particular pressure range (e.g., high pressure), atmospheric pressure, vacuum pressure, or the like.

In some embodiments, the carrier 200 is a customized mechanical adapter to allow handling of a process kit ring by automation to be moved through the tool that are designed for wafer handling. The fingers 220 allow for maintenance of the carrier 200 and replacement with different finger material types depending on the needs for a particular process kit ring. The carrier 200 with replaceable fingers 220 enables current process kit rings and allows for future compatibility with various sizes and material types of process kit rings.

In some embodiments, different rigid bodies 210 are used for different content and/or different conditions. In some embodiments, each carrier body 210 is made of a different type of material. In some examples, a carrier body 210 is made of one or more of carbon fiber, aluminum, aluminum cast plate (e.g., MIC-6®), hard anodized aluminum, ceramic material, titanium, or the like. In some embodiments, the carrier body 210 is the same or a similar material as a robot blade (e.g., end effector). In some embodiments, the carrier 200 does not have any glued components (e.g., no adhesive).

In some embodiments, the carrier 200 does not have any thermal press fit components. In some embodiments, all features of the carrier 200 are mechanically engaged (e.g., via fasteners 240) or machined into the carrier body 210.

In some embodiments, the carrier 200 has pads (e.g., mushroom pads, perfluoroelastomer pads, Kalrez® 8475 friction pads, nine Kalrez mushroom pads, calibrated mushrooms, pads integral to the carrier body 210) for non-slip interface (e.g., automation interface) with the atmosphere robot end effector (e.g., factory interface robot 111 of FIG. 1) and the vacuum robot end effector (e.g., transfer chamber robot 112 of FIG. 1). In some embodiments, the pads are used for non-slip interface with one or more of an LCF device, an aligner device, or the like. In some embodiments, the carrier 200 has pads (e.g., aluminum pads, pads integral to the carrier body 210) for locating the carrier 200 in an enclosure system (e.g., enclosure system 130 of FIG. 1, FOUP) and load locks (e.g., degassing chamber 104 of FIG. 1).

In some embodiments, the carrier body 210 has a lower surface that is substantially planar (e.g., substantially flat). In some embodiments, the lower surface of the carrier body 210 is substantially flat except for the pads on the lower surface of the carrier body 210. In some embodiments, the carrier 200 (e.g., carrier body 210) does not have kinematic locating features (e.g., does not have kinematic locating features on the lower surface of the carrier body 210). In some embodiment, the carrier body 210, rotation prevention component 230, and/or the fingers 220 have one or more coatings. In some examples, the fingers 220 and/or rotation prevention component 230 have a coating configured for transportation of content in particular conditions (e.g., adapted for certain chemistries and/or processes). In some embodiments, the fingers 220 and/or have one or more coatings that provide one or more coefficients of friction to allow the content to align on the fingers. In some examples, the sidewall of each finger 220 has a lower coefficient of friction than the first upper surface of each finger to allow the content to slide down the sidewall and stop at the first upper surface. In some examples, an upper portion of the sidewall of each finger 220 has a lower coefficient of friction than a lower portion of the sidewall of each finger 220 to allow the content to slide down the upper portion of each sidewall and slow down at the lower portion of each sidewall.

In some embodiments, the outline of the carrier body 210 is different than that shown in FIGS. 2A-C. In some embodiments, the size, shape, quantity, or the like of the openings 212 and/or openings 216 are different than those shown in FIGS. 2A-C.

In some embodiments, different fasteners 240 are one or more of different sizes, different shapes, different material, or the like. In some embodiments, the material of a fastener 240 includes one or more of aluminum, ceramic, stainless steel, electropolished (EP) stainless steel, or the like.

In some embodiments, a finger 220 has a lip that comes down to support content. In some embodiments, the fingers 220 are disposed around the carrier body 210 to support content with a circular perimeter, such as a process kit ring, a showerhead, or the like. In some embodiments, the fingers 220 are replaceable to support content of different sized perimeters. In some embodiments, the fingers 220 are attached to the carrier body 210 via slots that allow the location of the fingers 220 to be adjustable (e.g., radially from the central portion of the carrier body 210) to support content of different sized perimeters. In some embodiments, as a finger 220 is worn over time, the location of the finger 220 is adjustable (e.g., radially from the central region 280 of the carrier body 210) to continue supporting content of the same sized perimeter. In some embodiments, once finger 220 is worn and is unable to continue supporting content of the same sized perimeter, the worn finger 220 is replaced with a new finger 220.

The carrier 200 includes one or more lower surfaces (e.g., pads) configured to interface with an end effector of a robot arm. The carrier 200 (e.g., carrier body 210) includes one or more lower surfaces (e.g., solid planar central region 214) configured to interface with a vacuum chuck.

In some embodiments, the carrier body 210 forms a protrusion (e.g., boss) around each opening 216. In some embodiments, a boss is a protruding feature of the carrier body 210. In some embodiments, the protrusion is used to locate a finger 220 on the carrier body 210. In some embodiments, the finger 220 has a recess that matches the protrusion. In some embodiments, the protrusion causes the finger 220 to be attached in a correct orientation on the carrier body 210.

In some embodiments, the carrier 200 is sized and shaped to provide one or more gaps between the process kit ring 250 and one or more portions of the perimeter of the carrier 200. In some embodiments, the one or more gaps are used by the aligner device and/or the LCF device for alignment of the carrier 200 and/or the process kit ring 250. In some examples, the one or more gaps enable a light beam to be used to detect a flat inner surface 252 or other registration feature of the process kit ring 250. In some embodiments, the one or more gaps are used by the lift pins to be able to lift the process kit ring 250 off of the carrier 200 (e.g., within a processing chamber). In some embodiments, the perimeter of the carrier 200 is configured to interface with a shelf of an enclosure system (e.g., FOUP) of a substrate processing system.

In some embodiments, the carrier 200 is a semiconductor process kit carrier to prevent rotation during transport. The carrier 200 may have a feature (e.g., rotation prevention component 230) to prevent rotation (e.g., process kit ring rotation) during transport. The carrier 200 including the rotation prevention component 230 may prevent the process kit ring 250 from rotating relative to the carrier 200 within the FOUP during transportation through the facility. The rotation prevention component 230 may secure the process kit ring 250 during transportation.

The alignment of the process kit ring 250 in the processing chamber may be used for proper operation of the processing chamber. An aligner device may be used to correct minor alignment error (e.g., within a few degrees) of the process kit ring 250 on the carrier 200. The process kit ring 250 may be closely aligned on the carrier 200 with respect to the robot end effectors and handoff stations so that the aligner device can correct small rotational misalignment between the process kit ring 250 and the carrier 200.

The protrusions (e.g., two fingers) of the rotation prevention component 230 may make contact with the inside diameter of the process kit ring 250 on the sides of the flat inner surface (e.g., flat alignment feature) of the process kit ring 250. The protrusions (e.g., two fingers) may prevent the process kit ring 250 from rotating.

The rotation prevention component 230 may aid in process kit ring-to-carrier alignment and may prevent process kit ring rotation relative to the carrier 200 during transport. The process kit ring to carrier alignment may be less than or equal to plus or minus 2.5 degrees. The process kit ring to processing chamber alignment may be less than or equal to about plus or minus 0.6 degrees.

The rotation prevention component 230 may be referred to as a rotation blocking part (e.g., made of PBI). In some embodiments, the carrier body 210 is made of aluminum and the rotation prevention component 230 is made of PBI.

The flat inner surface 252 of the process kit ring 250 may be similar to features (e.g., notches, flats, etc.) of substrates (e.g., silicon wafers, notch of substrate), electrostatic chucks (e.g., flat of electrostatic chuck), etc. that are used for alignment of components and content.

Figure 3A:
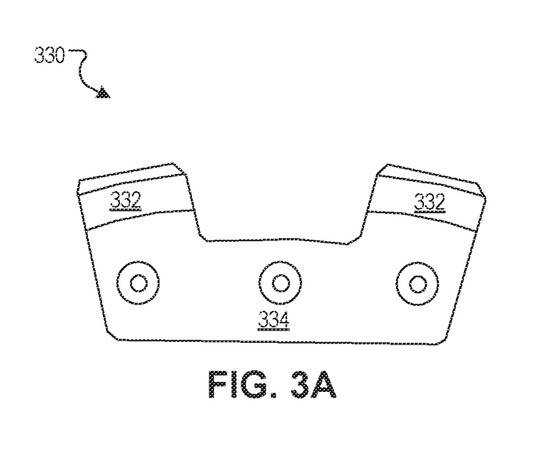
FIGS. 3A-C illustrate views of a rotation prevention component, according to certain embodiments.
Figure 3B:
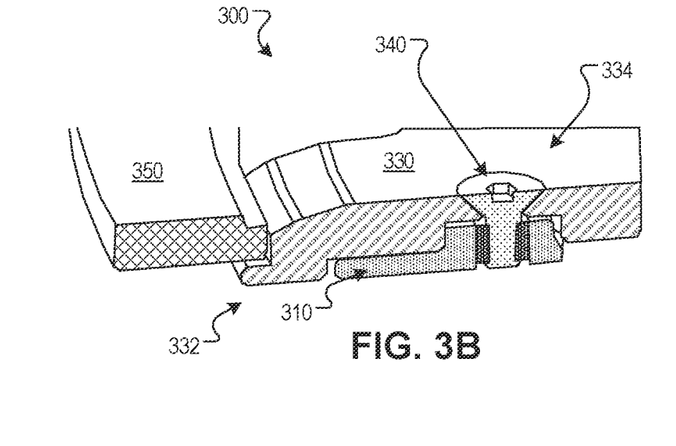
Figure 3C:
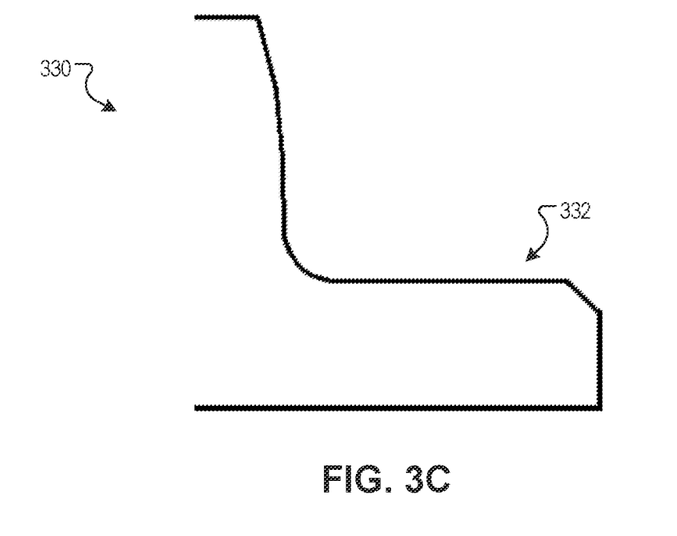

FIGS. 3A-C illustrate views of a rotation prevention component 330 (e.g., rotation prevention component 230 of FIGS. 2A-B), according to certain embodiments.

In some embodiments, the rotation prevention component includes a first protrusion and a second protrusion. The first protrusion may be configured to be disposed proximate a first portion of a curved inner surface of the process kit ring 350 (e.g., process kit ring 250 of FIG. 2A, content 110 of FIG. 1) on a first side of the flat inner surface 252. The second protrusion may be configured to be disposed proximate a second portion of the curved inner surface of the process kit ring 250 on a second side of the flat inner surface 252.

In some embodiments, the rotation prevention component 330 includes an outer surface configured to be disposed proximate a curved inner surface of the process kit ring 350 and a lower surface configured to be disposed under the process kit ring 350 to block light between the curved inner surface of the process kit ring 350 and the outer surface.

In some embodiments, the rotation prevention component 330 includes a lower surface forming a recess configured to interface with a protrusion on an upper surface of the carrier body 310 (e.g., carrier body 210 of FIGS. 2A-C).

In some embodiments, an upper surface of the carrier body 310 forms one or more protrusions disposed proximate a corresponding outer surface of the rotation prevention component 330 to prevent rotation of the rotation prevention component 330 relative to the carrier body 310.

In some embodiments, the rotation prevention component 330 maintains alignment between one or more of the process kit ring 350 and the carrier 300 (e.g., carrier 200 of FIGS. 2A-C) within about plus or minus 2.5 degrees or the process kit ring 350 and a processing chamber within about plus or minus 0.6 degrees.

In some embodiments, the rotation prevention component 330 is configured to be disposed proximate the flat inner surface of the process kit ring 350 without blocking the flat inner surface 352.

In some embodiments, the rotation prevention component 330 includes an attachment portion 334 forming openings, where the attachment portion 334 is configured to receive a corresponding fastener 340 (e.g., fastener 240 of FIGS. 2A-B) via each of the plurality of openings to attach the attachment portion 334 to a carrier body 310 of the carrier 300. The rotation prevention component 330 may include one or more protrusion portions 332 extending from the attachment portion 334, where the one or more protrusion portions 332 are configured to be disposed proximate a flat inner surface of a process kit ring 350 disposed on the carrier 300 to prevent rotation of the process kit ring 350.

In some embodiments, the carrier 300 includes fingers configured to support a process kit ring 350. The carrier 300 may further include a rotation prevention component 330 configured to prevent rotation of the process kit ring 350. The rotation prevention component 330 may include a first protrusion and a second protrusion. The first protrusion may be configured to be disposed proximate a first portion of a curved inner surface of the process kit ring 350 on a first side of a flat inner surface of the process kit ring 350. The second protrusion may be configured to be disposed proximate a second portion of the curved inner surface of the process kit ring 350 on a second side of the flat inner surface.

In some embodiments, at least one of the rotation prevention component 330 or the fingers are integral to a carrier body 310 of the carrier 300.

Carrier 300 may allow the flat inner surface 352 to be visible (e.g., to scan for alignment). Carrier 300 may restrict rotation of the process kit ring 350 to be about plus or minus one degree. Protrusions (e.g., side surface) on the upper surface of the carrier body 310 may prevent rotation of the rotation prevention component 330. A portion of rotation prevention component 330 may be configured to be below the process kit ring 350 to block light (e.g., a light blocking feature without touching the process kit ring 350, block light at the aligner device and/or LCF device).

Carrier 300 may align the process kit ring 350 and the carrier 300 at a plus/minus one degree alignment (e.g., from a center axis of the carrier 300). The process kit ring 350 and carrier 300 may be aligned at the same axis (e.g., through the center of the rotation prevention component 330). The aligner device may be able to rotate the process kit ring 350 and carrier 300 along the same axis to about plus or negative 2.5 degrees.

In some embodiments, the process kit ring 350 does not contact the rotation prevention component 330 (e.g., there is a space been the inner surface of the process kit ring and the outer surface of the rotation prevention component 330 and there is a space between the lower surface of the process kit ring 350 and the upper surface of the protrusion of the rotation prevention component 330).

As shown in FIG. 3C, the distal end of the rotation prevention component 330 may have a sloped outer surface that slopes to the upper surface over which the process kit ring 350 is to be disposed.

Figure 4A:
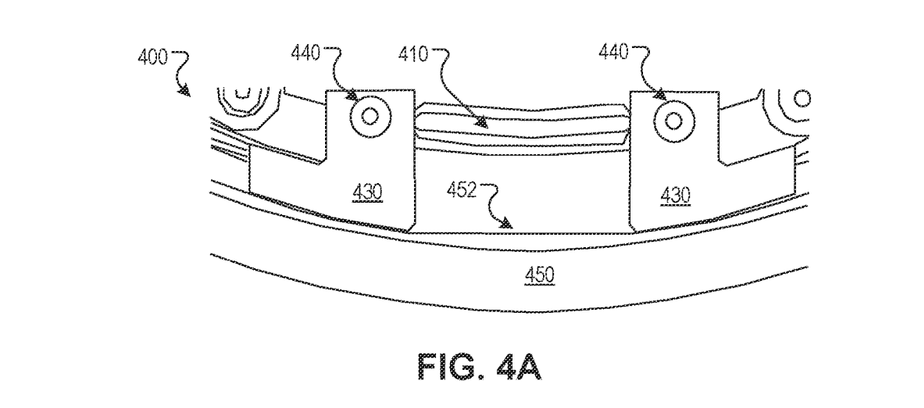
FIGS. 4A-B illustrate views of a carrier supporting a process kit ring, according to certain embodiments.
Figure 4B:
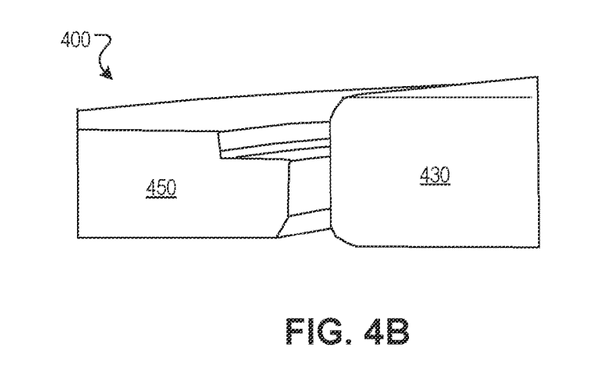

FIGS. 4A-B illustrate views of a carrier 400 (e.g., one or more of carrier 200 of FIGS. 2A-C, carrier 300 of FIGS. 3A-C, etc.) supporting a process kit ring 450 (e.g., one or more of process kit ring 250 of FIG. 2A, process kit ring 350 of FIG. 3B, etc.), according to certain embodiments. Carrier 400 may have a rotation prevention component 430 that includes multiple parts (e.g., a first rotation prevention component 430 to be disposed on first side of the flat inner surface 452 and a second rotation prevention component 430 to be disposed on a second side of the flat inner surface 452).

Carrier 400 may allow the flat inner surface 452 on the process kit ring 450 to be visible (e.g., for scanning for alignment).

Figure 5:
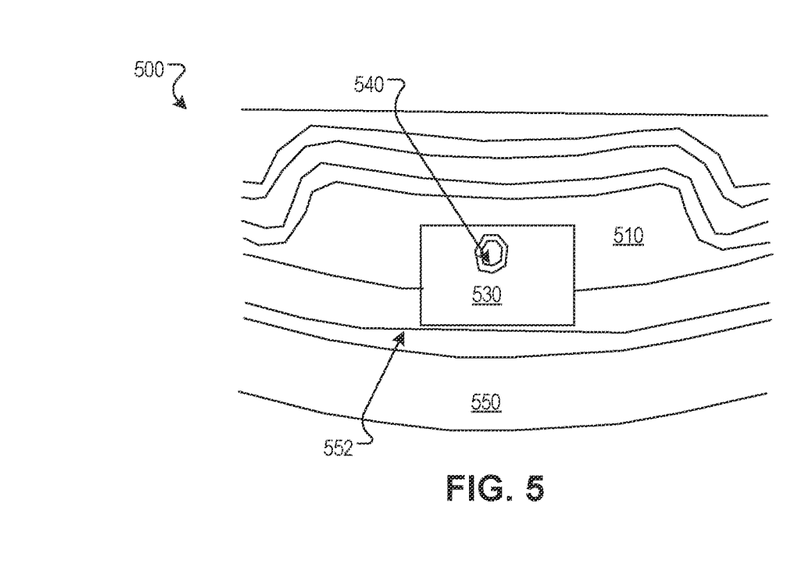
FIG. 5 illustrates a carrier supporting a process kit ring, according to certain embodiments.

FIG. 5 illustrates a carrier 500 (e.g., one or more of carrier 200 of FIGS. 2A-C, carrier 300 of FIGS. 3A-C, carrier 400 of FIGS. 4A-B, etc.) supporting a process kit ring 550 (e.g., one or more of process kit ring 250 of FIG. 2A, process kit ring 350 of FIG. 3B, process kit ring 450 of FIGS. 4A-B, etc.), according to certain embodiments. Carrier 500 may include a rotation prevention component 530 that is disposed against the flat inner surface 552. Carrier 500 may be basic and easy to manufacture.

The preceding description sets forth numerous specific details such as examples of specific systems, components, methods, and so forth in order to provide a good understanding of several embodiments of the present disclosure. It will be apparent to one skilled in the art, however, that at least some embodiments of the present disclosure can be practiced without these specific details. In other instances, well-known components or methods are not described in detail or are presented in simple block diagram format in order to avoid unnecessarily obscuring the present disclosure. Thus, the specific details set forth are merely exemplary. Particular implementations can vary from these exemplary details and still be contemplated to be within the scope of the present disclosure.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or." When the term "about" or "approximately" is used herein, this is intended to mean that the nominal value presented is precise within ±10%.

Although the operations of the methods herein are shown and described in a particular order, the order of operations of each method can be altered so that certain operations are performed in an inverse order so that certain operations are performed, at least in part, concurrently with other operations. In another embodiment, instructions or sub-operations of distinct operations are in an intermittent and/or alternating manner.

The terms "over," "under," "between," "disposed on," and "on" as used herein refer to a relative position of one material layer or component with respect to other layers or components. For example, one layer disposed on, over, or under another layer may be directly in contact with the other layer or may have one or more intervening layers. Moreover, one layer disposed between two layers may be directly in contact with the two layers or may have one or more intervening layers. Similarly, unless explicitly stated otherwise, one feature disposed between two features may be in direct contact with the adjacent features or may have one or more intervening layers.

It is understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A carrier comprising:
  a carrier body;
  a plurality of fingers attached to the carrier body, wherein the plurality of fingers are configured to support a process kit ring; and
  a rotation prevention component comprising:
    an attachment portion fastened to the carrier body;
    a first protrusion that extends past a perimeter of the carrier body proximate a first side of a flat inner surface of the process kit ring; and
    a second protrusion that extends past the perimeter of the carrier body proximate a second side of the flat inner surface of the process kit ring, wherein the rotation prevention component is configured to be disposed proximate the flat inner surface of the process kit ring to prevent rotation of the process kit ring.

2. The carrier of claim 1, wherein:
  the first protrusion is configured to be disposed proximate a first portion of a curved inner surface of the process kit ring on the first side of the flat inner surface; and
  the second protrusion configured to be disposed proximate a second portion of the curved inner surface of the process kit ring on the second side of the flat inner surface.

3. The carrier of claim 1, wherein the rotation prevention component comprises:
  an outer surface configured to be disposed proximate a curved inner surface of the process kit ring; and
  a lower surface configured to be disposed under the process kit ring to block light between the curved inner surface and the outer surface.

4. The carrier of claim 1, wherein the rotation prevention component comprises a lower surface forming a recess configured to interface with a protrusion on an upper surface of the carrier body.

5. The carrier of claim 1, wherein an upper surface of the carrier body forms one or more protrusions disposed proximate a corresponding outer surface of the rotation prevention component to prevent rotation of the rotation prevention component relative to the carrier body.

6. The carrier of claim 1, wherein the rotation prevention component maintains alignment between one or more of:
  the process kit ring and the carrier within about plus or minus 2.5 degrees; or
  the process kit ring and a processing chamber within about plus or minus 0.6 degrees.

7. The carrier of claim 1, wherein the plurality of fingers are configured to align the process kit ring horizontally relative to the carrier body.

8. The carrier of claim 1, wherein the rotation prevention component comprises a thermoplastic.

9. The carrier of claim 1, wherein the rotation prevention component comprises polybenzimidazole (PBI) fiber.

10. The carrier of claim 1, wherein the rotation prevention component is configured to be disposed proximate the flat inner surface of the process kit ring without blocking the flat inner surface.

11. A rotation prevention component of a carrier, the rotation prevention component comprising:
  an attachment portion forming a plurality of openings, wherein the attachment portion is configured to receive a corresponding fastener via each of the plurality of openings to attach the attachment portion to a carrier body of the carrier;
  a plurality of protrusion portions extending from the attachment portion, the plurality of protrusion portions comprising:
    a first protrusion that is configured to extend past a perimeter of the carrier body proximate a first side of a flat inner surface of a process kit ring; and
    a second protrusion that extends past the perimeter of the carrier body proximate a second side of the flat inner surface of the process kit ring, wherein the plurality of protrusion portions are configured to be disposed proximate the flat inner surface of the process kit ring disposed on the carrier to prevent rotation of the process kit ring.

12. The rotation prevention component of claim 11, wherein;
  the first protrusion is configured to be disposed proximate a first portion of a curved inner surface of the process kit ring on the first side of the flat inner surface; and
  the second protrusion configured to be disposed proximate a second portion of the curved inner surface of the process kit ring on the second side of the flat inner surface.

13. The rotation prevention component of claim 11, wherein each of the plurality of protrusion portions comprises:
an outer surface configured to be disposed proximate a curved inner surface of the process kit ring; and
a lower surface configured to be disposed under the process kit ring to block light between the curved inner surface and the outer surface.

14. The rotation prevention component of claim 11, wherein the rotation prevention component comprises a lower surface forming a recess configured to interface with a protrusion on an upper surface of the carrier body.

15. The rotation prevention component of claim 11, wherein the rotation prevention component maintains alignment between one or more of:
the process kit ring and the carrier within about plus or minus 2.5 degrees; or
the process kit ring and a processing chamber within about plus or minus 0.6 degrees.

16. The rotation prevention component of claim 11, wherein the rotation prevention component comprises a thermoplastic.

17. The rotation prevention component of claim 11, wherein the rotation prevention component comprises polybenzimidazole (PBI) fiber.

18. The rotation prevention component of claim 11, wherein the rotation prevention component is configured to be disposed proximate the flat inner surface of the process kit ring without blocking the flat inner surface.

19. A carrier comprising:
a plurality of fingers configured to support a process kit ring; and
a rotation prevention component configured to prevent rotation of the process kit ring, the rotation prevention component comprising:
a first protrusion that extends past a perimeter of a carrier body of the carrier and is configured to be disposed proximate a first portion of a curved inner surface of the process kit ring on a first side of a flat inner surface of the process kit ring; and
a second protrusion that extends past the perimeter of the carrier body and is configured to be disposed proximate a second portion of the curved inner surface of the process kit ring on a second side of the flat inner surface.

20. The carrier of claim 19, wherein at least one of the rotation prevention component or the plurality of fingers are integral to the carrier body of the carrier.

* * * * *